(12) United States Patent
Rohan et al.

(10) Patent No.: US 8,438,062 B2
(45) Date of Patent: May 7, 2013

(54) NETWORK NODE AD TARGETING

(75) Inventors: Terrence Rohan, Atherton, CA (US); Tomasz J. Tunguz-Zawislak, San Francisco, CA (US); Scott G. Sheffer, Palo Alto, CA (US); Jeremiah Harmsen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1073 days.

(21) Appl. No.: 11/618,506

(22) Filed: Dec. 29, 2006

(65) Prior Publication Data
US 2008/0162260 A1 Jul. 3, 2008

(51) Int. Cl.
*G06Q 30/00* (2006.01)

(52) U.S. Cl.
USPC ............. 705/14.66; 705/319; 705/14.53; 705/14.52; 705/14.49

(58) Field of Classification Search .............. 705/14.66, 705/319, 14.53, 14.52, 14.49
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,151,585 A * | 11/2000 | Altschuler et al. | 705/7.29 |
| 6,167,382 A | 12/2000 | Sparks et al. | |
| 6,269,361 B1 | 7/2001 | Davis et al. | |
| 6,285,999 B1 | 9/2001 | Page | |
| 6,401,075 B1 | 6/2002 | Mason et al. | |
| 6,799,176 B1 | 9/2004 | Page | |
| 6,985,882 B1 | 1/2006 | Del Sesto | |
| 7,039,599 B2 | 5/2006 | Merriman | |
| 7,058,628 B1 | 6/2006 | Page | |
| 7,136,875 B2 | 11/2006 | Anderson et al. | |
| 7,269,587 B1 | 9/2007 | Page | |
| 7,685,016 B2 * | 3/2010 | Flores et al. | 705/7.11 |
| 7,933,843 B1 * | 4/2011 | von Groll et al. | 705/319 |
| 2002/0062368 A1 * | 5/2002 | Holtzman et al. | 709/224 |
| 2004/0249713 A1 * | 12/2004 | Gross | 705/14 |
| 2005/0149397 A1 * | 7/2005 | Morgenstern et al. | 705/14 |
| 2006/0271564 A1 * | 11/2006 | Meng Muntz et al. | 707/100 |

(Continued)

FOREIGN PATENT DOCUMENTS

| | | |
|---|---|---|
| EP | 1209599 | 5/2002 |
| JP | 2005174149 | 6/2005 |

(Continued)

OTHER PUBLICATIONS

"Friends and Neighbors on the Web." Lada A. Adamic, et al., Social Networks, vol. 25, 2003.*

(Continued)

*Primary Examiner* — Michael Bekerman
*Assistant Examiner* — Luis Brown
(74) *Attorney, Agent, or Firm* — Fish & Richardson P.C.

(57) ABSTRACT

A computer-implemented method for displaying advertisements to members of a network comprises identifying one or more communities of members, identifying one or more influencers in the one or more communities, and placing one or more advertisements at the profiles of one or more members in the identified one or more communities.

33 Claims, 7 Drawing Sheets

U.S. PATENT DOCUMENTS

| | | | |
|---|---|---|---|
| 2007/0121843 A1* | 5/2007 | Atazky et al. | 379/114.13 |
| 2007/0198510 A1* | 8/2007 | Ebanks | 707/5 |
| 2007/0214097 A1* | 9/2007 | Parsons et al. | 706/12 |
| 2007/0260725 A1* | 11/2007 | McCuller | 709/224 |
| 2008/0005072 A1* | 1/2008 | Meek et al. | 707/3 |
| 2008/0070209 A1* | 3/2008 | Zhuang et al. | 434/236 |

FOREIGN PATENT DOCUMENTS

| | | |
|---|---|---|
| JP | 2005244647 | 9/2005 |
| JP | 2006309600 | 11/2006 |
| KR | 2000-0064105 | 11/2000 |
| KR | 2001-0035449 | 5/2001 |
| KR | 2002-0068682 | 8/2002 |
| KR | 2003-0076545 | 9/2003 |
| WO | WO 97/21183 | 6/1997 |
| WO | WO2006040405 | * 4/2006 |

OTHER PUBLICATIONS

Dholakia, Utpal., et al. "A Social Influence Model of Consumer Participation in Network and Small Group based Virtual Communities." International Journal of Research in Marketing, vol. 24, Sep. 1, 2003, pp. 241-263.*
95/001,073, Reexamination of Stone et al.
95/001,061, Reexamination of Stone et al.
95/001,069, Reexamination of Dean et al.
95/001,068, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Slashdot; SourceForge, Inc., http://slashdot.org/; (accessed Feb. 19, 2009), 32 pages.
Huomay.com; David Harry; http://www.huomah.com/; (accessed Feb. 19, 2009); 6 pages.
Baumes, Jeffrey, et al., Efficient Identification of Overlapping Communities, Intelligence and Security Informatics, Springer Berlin/Heidelberg publ., pp. 27-36 (2005).
Olsen, Stefanie, Turning Social Network Traffic Into Dollars, www.news.com Oct. 18, 2006.
European Patent Office, EP Application No. 07865827.5, in European Search Report, mailed Oct. 24, 2011, 7 pages.
EP, "Notice from the European Patent Office dated Oct. 1, 2007 concerning business methods," Nov. 1, 2007 Official Journal of the European Patent Office, vol. 30, No. 11, pp. 592-593, 2 pages.
Korean Intellectual Property Office, PCT International Application No. PCT/US2007/087984, filed Dec. 18, 2007, in International Search Report mailed May 19, 2008, 10 pages.
The State Intellectual Property Office of the People's Republic of China, Chinese Patent Application No. 200780051784.9, in Office Action mailed Feb. 22, 2011, 5 pages.
The State Intellectual Property Office of the People's Republic of China, Chinese Patent Application No. 200780051784.9, in Office Action mailed Feb. 28, 2012, 6 pages.
Corporate Marketing using Specialized Social Networking Services, SNS Business Guide, Impress Japan Corporation, Jul. 11, 2006, First Publication, pp. 113-116 (no English version available).
Japanese Patent Office, JP Application No. 2009-544187, Office Action dated Jul. 2, 2012, 10 pages.
Oomukai, Kazuki, Current Status and Future Perspectives of Social Networking Services, Information Processing, Information Processing Society of Japan, Sep. 15, 2006, vol. 47, No. 9, pp. 993-1000 (no English version available).
Takami, Shinya et al., Buzz Marketing in the Web Log Communities, DEWS 2006 Proceedings [Online], Institute of Electronics, Information and Communication Engineers Data Engineering Research Board, Jun. 30, 2006 [no English version available).

* cited by examiner

NETWORK NODE AD TARGETING

TECHNICAL FIELD

In general, this document describes advertising to members in communities within an online social network by displaying advertisements relevant to the common interest of the members of the community. In one example, a system may receive the profiles of all the members of an online social network, identify communities of members, determine the common interest of members of the community and display advertisements relevant to each community on the profiles of the members within the community.

BACKGROUND

As the Internet has become increasingly popular, online social networks are becoming an important and pervasive mechanism for communication, entertainment, and professional and social networking. Members of a network implicitly associate or explicitly link themselves with one or more members within the network based on factors such as common interests. Interaction and signaling between members either directly or through other members cause the formation of communities of common interests within the online social network. The members of such communities are connected by one or more common interests.

Factors such as member interactions, content on member profiles, dynamically changing size of the community, and the like establish a hierarchy within a community where certain members are more popular than others and, consequently, wield enhanced influence over other members in the community.

SUMMARY

The present inventors recognized that blanket advertising across the network tends not to be cost-efficient to advertisers, since the members of the network tend not to be interested in the products and services being advertised unless the advertisements are relevant to the members' interest. Presenting to advertisers a community of members sharing a common interest provides advertisers with an opportunity to present products and services of interest to the members of the network, thereby maximizing the return on the investment made to advertising.

The present inventors also recognized that advertising to members of an online social network based solely on the content of their profile lacks targeted generation of advertisements. Members of a community may have content on their profile in addition to the common interest of the community, such as personal information, etc. Relying solely on the content of the profile of a member of a community decreases the specificity of advertisements to the community since the presence of additional information distorts the signal from the content related to the common interests.

In one implementation, a computer-implemented method for displaying advertisements to members of a network is described. The method includes identifying one or more communities within a network, wherein the community can include a plurality of members of the network, identifying one or more influencers in the one or more communities, and placing one or more advertisements at the profiles of one or more members in the one or more communities.

This and other aspects can include one or more of the following features. The method can further include receiving information pertaining to a plurality of members belonging to the network, wherein the information comprises content of profiles of the plurality of members and links between the plurality of members. Identifying one or more communities can include grouping members based on the links established between the members of the network. The link can connect a first member with one or more members of the network. Each link can have a weight. The method can further include identifying one or more common interests of the plurality of members of a community based on the content of the profiles of the plurality of members. The method can further include ranking the plurality of members belonging to each of the one or more communities based on the links between the members of the community. The influencer can be a the member with the highest rank. The network can include an online social network. The profile can comprise one or more web pages stored on a server hosting the online social network. A member of the network can belong to one or more of the plurality of communities. The one or more advertisements can be placed solely on the profiles of the one or more influencers.

In another aspect, an advertisement server for displaying advertisements to members of a network is described. The advertisement server includes a community identifier configured to identify one or more communities, and identify one or more influencers in the one or more communities, and an advertisement inventory configured to store advertisements to be displayed on the profiles of one or more members of the identified communities.

This and other aspects can include one or more of the following features. The advertisement server can further include a network inventory configured to store the information pertaining to the plurality of members belonging to the network, wherein the information includes content of profiles of the plurality of members and links between the plurality of members. The community identifier can further be configured to group members based on the links established between the members of the network. The link can connect a first member with one or more members of the network. Each link can have a weight. The community identifier can further be configured to identify one or more common interests of the plurality of members of a community based on the content of the profiles of the plurality of members. The community identifier can further be configured to rank the plurality of members belonging to each of the one or more communities based on the links between the members of each community. The influencer can be the member with the highest rank. The network can include an online social network. The profile can include one or more web pages stored on a server hosting the online social network. A member of the network can belong to one or more of the plurality of communities. The one or more advertisements can be placed solely on the profiles of the one or more influencers.

In another aspect, an advertisement server for displaying advertisements to members of a network is described. The advertisement server includes a means for identifying one or more communities, and identifying one or more influencers in the one or more communities, and a means for storing advertisements to be displayed on the profiles of one or more members of the identified communities.

This and other aspects can include one or more of the following features. The advertisement server can further include a means for storing the information pertaining to the plurality of members belonging to the network, wherein the information comprises content of profiles of the plurality of members and links between the plurality of members. The means for identifying one or more communities and identifying one or more influencers in the one or more communities is further configured to group members based on the links established between the members of the network. The link can connect a first member with one or more members of the network. Each link can have a weight. The means for identifying one or more communities and identifying one or more influencers in the one or more communities can further be configured to identify one or more common interests of the plurality of members of a community based on the content of the profiles of the plurality of members. The means for identifying one or more communities and identifying one or more influencers in the one or more communities is further configured to rank the plurality of members belonging to each of the one or more communities based on the links between the members of each community. The influencer can be the member with the highest rank. The network can include an online social network. The profile can include one or more web pages stored on a server hosting the online social network. A member of the network can belong to one or more of the plurality of communities. The one or more advertisements can be placed solely on the profiles of the one or more influencers.

The systems and techniques described here may provide one or more of the following advantages. First, a system can identify communities of common interests within an online social network. This may allow advertisers to target the communities based on the common interest of the community, as opposed to the content of individual profiles. Second, a system can identify members who belong to overlapping communities as a result of more than one common interest. By blending advertisements relevant to the interests of each of the overlapping communities, advertisers may target the members common to these communities. Third, a system can identify the influencers from among the members of a community. This may provide advertisers with the option of targeting either all members in the community or advertising only on the profile of the influencer, thereby targeting the entire community.

In addition, the system encourages members of communities in online social networks to enrich the content on their profiles. The presence of high quality content relevant to shared interests on a member's profile increases the popularity of the member in the community and improves a member's chances of being an influencer. An influencer may receive financial incentives from advertisers in exchange for permission to display advertisements on the member's profile.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
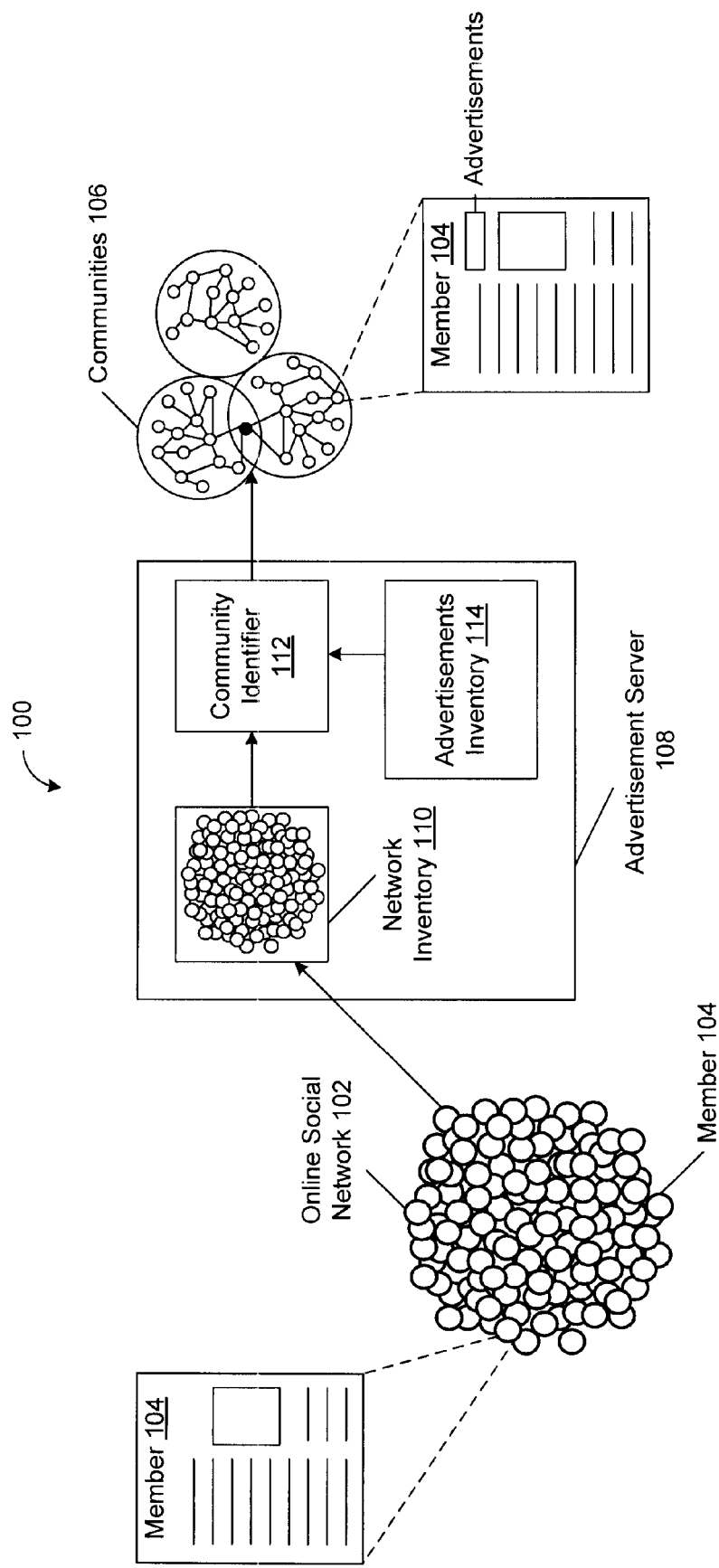
FIG. 1 is a schematic diagram of an example of a system for advertising to communities in an online social network.

FIG. 1 depicts a schematic diagram of an example of a system 100 for advertising to communities in an online social network 102. An online social network 102 includes interconnected profiles of members 104, for example, web pages stored of the network. Further, the online social network 102 includes hosted web pages that describe the profiles and the characteristics of the members 104 of the network 102. Examples of online social networks can include orkut.com, myspace.com, and friendster.com. Alternatively, other types of online social networks or personal web pages may be used, such as job hunting web sites (e.g., monster.com), school alumni web sites, organizations of professionals, Internet dating sites, ratings sites (e.g., hotornot.com), and a company employee internal web site.

The system 100 identifies one or more communities 106 of members 104 within the online social network 102. Further, the system 100 identifies one or more influencers of communities 106. The one or more influencers are identified based on factors including traffic to the profile, number of friends, group membership, number of user interactions, popularity within the community and profile content.

The online social network 102 comprises the profiles of members 104. The network 102 is hosted by a server. The profile of a member 104 comprises one or more web pages stored on the server and linked to profiles of one or more members 104 of the network 102. In one implementation, the system 100 includes an advertisement server 108 to receive all the profiles of members 104 of the online social network 102. Each member 104 establishes a link with at least one other member 104. In one aspect, a link is established when one member chooses another member as a friend. In another aspect, a link is established when one member visits another members web page frequently. In another aspect, a link is established when one member communicates with another member through the network. In yet another aspect, a link is established between two members when both members include themselves to the same community.

The network inventory 110 stores the links between members 104. The number and type of links in the online social network 102 are dynamic since the number of members 104 and the manner in which one member 104 links to another member 104 constantly changes. In one aspect, the online social network monitors and updates the links. The network sends the updated links to the advertisement server. The advertisement server overwrites the existing links with the new links and stores the links in the network inventory. In another aspect, the advertisement server monitors and updates the links and regularly overwrites the existing links in the network inventory with the new links.

In one implementation, a link between two members 104 has a weight associated with it. In one aspect, the weight of a link depends on the type of the link. For example, a link between two members where one member has designated another member as a friend is associated more weight than a link where one member occasionally visits another member's web page. In another aspect, the weights of links depend on the number of links that connect one member to one or more members. In another aspect, the links are designated equal weight. The weight of the links can also depend on factors such as community membership, interest intersection, circle of friends, distance between friends, geographic location, and demographic location.

The advertisement server 108 includes a community identifier 112. In one implementation, the community identifier 112 generates a community 106 based on the links between members in the network inventory 110. In one aspect, two members of a community are directly linked. In another aspect, two members of a community are linked indirectly by association through one or more members. In one implementation, the community identifier 112 employs graph theory and the network signals between the members of the community to generate a community 106.

The community identifier 112 receives the graph connecting the members of the network and the links between the members. Subsequently, the community identifier 112 iteratively optimizes the community 106 to account for addition of new members 104 and removal of old members 104 based on the links between the members 104. In this manner, the community identifier 112 groups members 104 of the online social network 102 into communities 106. In one aspect, members are added when members of the existing community link to members that were not part of the community during the initial generation. In another aspect, the community is affected by changes in the types of links between members. For example, a first member who frequently visits a second member's web page may designate the second member as a friend. This increases the strength of the link between the two members affecting the structure of the community. The strength of a link is also altered when a first member, linked to a second member through a third member, establishes a direct link to the second member. The strength of a link may also depend on factors such as frequency of member interaction, actions such as communication between members through messages on profiles, one member declaring themselves a second member's fan, and one member writing testimonials about a second member on the second member's profile.

Based on the links and the weight of the links between the members 104, the community identifier 112 generates one or more communities 106. The weight of the links change during the iterations due to the addition and subtraction of members 104. The community identifier 112 optimizes the weight of the links between members 104 of the community 106 until the community can no longer be improved. A community comprises at least two members. In addition, at least one member of the online social network may belong to more than one community.

Upon identifying the one or more communities 106 within the online social network 102, the advertisement server 108 identifies influencers within the community. In one implementation, the advertisement server 108 ranks the web pages of the members 104 in a community 106. The advertisement server uses a ranking algorithm, such as PageRank, to rank the members 104 in the community 106. The advertisement server designates influencers based on the rank of the members 104. In one aspect, the advertisement server designates one member as an influencer. In another aspect, the advertisement server designates more than one member from among the top ranked members as equal influencers of the community. In another aspect, the advertisement server associates weights to the top ranked members of the community, wherein the weight is directly proportional to the rank of the member, and the weight refers to the degree of influence of a member in the community.

The advertisement server 108 also stores the content of the profiles of members 104 of the online social network in the network inventory 110. Based on the content of the profiles, the advertisement server 108 identifies one or more common interests that connect the members 104 of a community 106. For example, a member with content related to soccer on the profile establishes links with other members with similar content on their profiles. A community of soccer fans is formed between the plurality of members. The community is characterized by the content on the member profiles as well as the links between the members. The community identifier identifies this community, ranks the members based on the types of links, and designates one or more influencers. Subsequently, the advertisement server designates soccer as a common interest of this community based on the content of the member profiles in the community.

Since the number of members and the content on the profiles of members is dynamic, the content of the network inventory 110 requires regular updating. In one aspect, the online social network monitors and updates the content on the profiles. The online social network transmits the updated content to the advertisement server. The advertisement server overwrites the existing content stored in the network inventory with the updated content. In another aspect, the advertisement server monitors the online social network, updates the content on the profiles and overwrites the existing content in the network inventory with the updated content.

The advertisement server 108 includes an advertisement inventory 114. The advertisement inventory 114 includes advertisements to be displayed on the one or more profiles of members 104 of the online social network 102. In one implementation, the advertisement server 108 retrieves advertisements from the advertisement inventory 114 that are relevant to the common interest of a community 106 and transmits the advertisements to the community identifier 112. The community identifier 112 identifies one or more profiles of members 104 belonging to the community 106 to display the advertisements. In one aspect, the identified one or more members are the one or more influencers of the community. In another aspect, the identified one or more members include the influencers and other members of the community.

The community identifier 112 also identifies members belonging to more than one community 106. Since a member 104 can establish links with more than one member 104 in the online social network 102, and since links are established based on the content of member profiles, one member 104 can belong to more than one community 106, each community 106 having a different interest. The advertisement server 108 determines the common interest of the more than one community 106 to which the member 104 belongs. The advertisement server 108 can display on the profiles of such members, one or more advertisements that are relevant to the more than one interest of the member 104.

In one aspect, the number of advertisements displayed on the member profile may represent the interests of the member equally. For example, if a member belongs to a community of soccer players and motorcycle riders, two advertisements related to soccer and two advertisements related to motorcycle gear may be displayed on the member's profile. In another aspect, the number of advertisements displayed on the member profile may be affected by the weight of the links and the rank of the member in each community. For example, if the weight of the links and the rank of the member in the soccer community is higher than those in the motorcycle riders community, three advertisements related to soccer and one related to motorcycle gear may be displayed on the member's profile.

Figure 2:
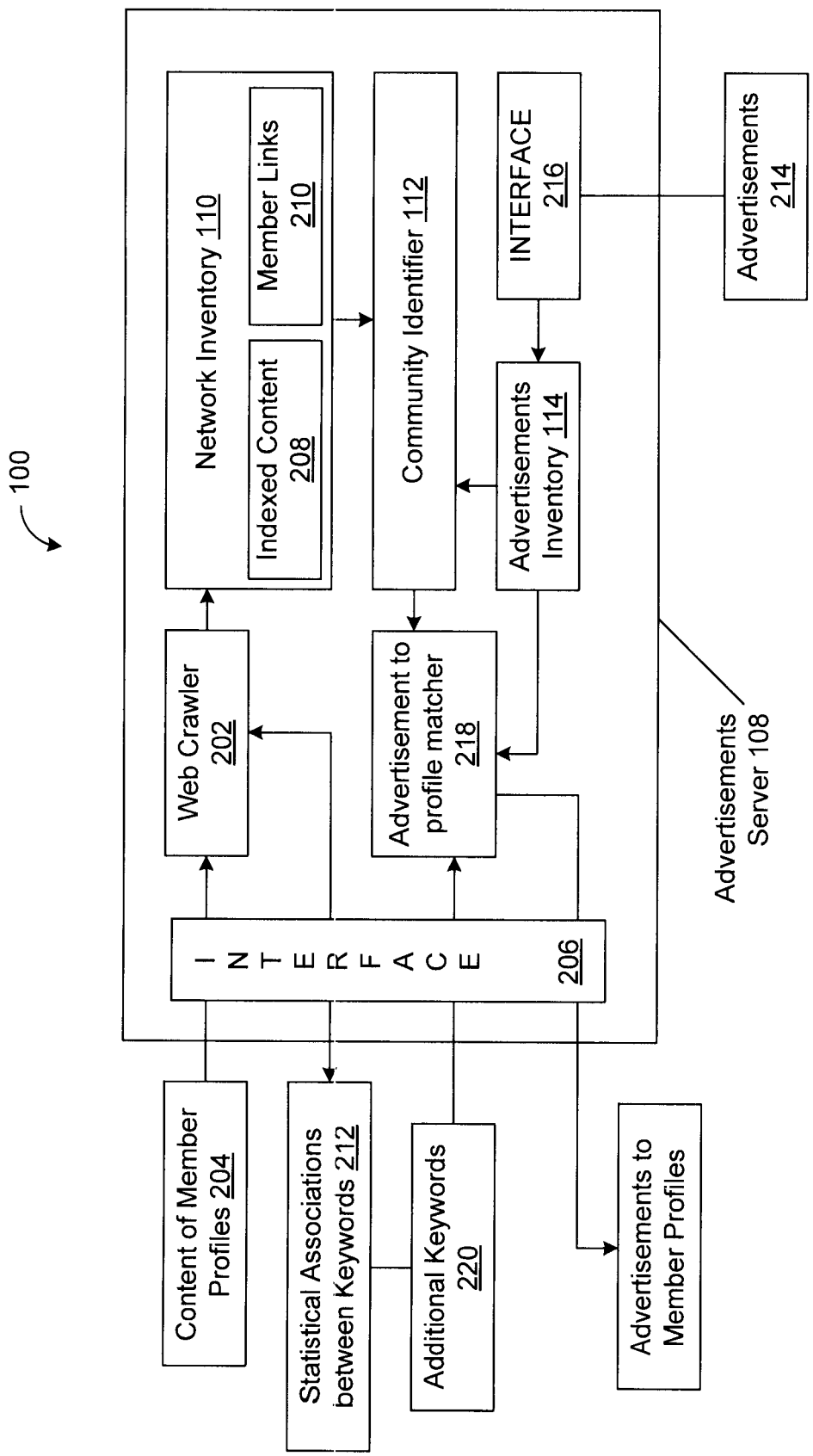
FIG. 2 is a schematic diagram of an example of a system for advertising to communities in an online social network.

FIG. 2 depicts a schematic diagram of an example of a system 100 for advertising to communities 106 in an online social network 102. The advertisement server 108 includes a web crawler 202. The web crawler 202 receives the contents of member profiles 204 via an interface 206. The web crawler 202 traverses the content of the member profiles 204 and generates the indexed content 208 stored in the network inventory 110. In addition, the links 210 between the members 104 of the online social network 102 are also stored in the network inventory 110.

In addition, the web crawler 202 can generate statistical associations between keywords and the content of the member profiles 204. For example, the content of the member profiles 204 can contain information used by the web crawler 202 to identify what keyword may be related to the content of the member profile. This information can include text within the profile, keywords (e.g., metadata) that describe the profile, frequencies of words occurring in the profile, font size of text in the profile (e.g., if one word has a larger font size, more emphasis can be given when associating the profile with keywords), or a hyperlink structure within the profile. The web crawler 202 can store the statistical associations in a repository 212.

The advertisement server 108 receives the advertisements 214 via an interface 216 and stores the advertisements 214 in the advertisements inventory 114. The advertisements 214 include sub-components, including a uniform resource identifier (URI), an image, a video, text, and/or keywords. The image, video, and text can form the information displayed on the profile of a member 104. In addition, the advertisement 214 may include audio or other appropriate media.

In certain implementations, the URI is a uniform resource link (URL) that permits a member 104 viewing the advertisement 214 to navigate from the profile of the member 104 to a web page of the advertiser. In other implementations, the URI can include contact information for the advertiser (e.g., telephone number, mailing address, email address, etc.).

The community identifier 112 identifies the communities 106 of members 104 based on the indexed content 208 and the member links 210. The advertisement to profile matcher 218 matches advertisements in the advertisement inventory 114 to profiles of members 104 identified by the community identifier 112 based on the indexed content 208, the member links 210, statistical associations between keywords 212 and additional key words 220.

Figure 3C:
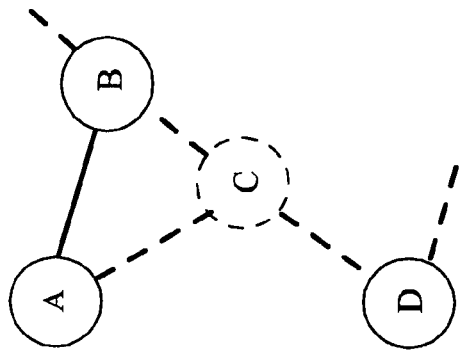
FIG. 3C is a schematic diagram of an example of a cluster of users connected by internal and external friendships.
Figure 3B:
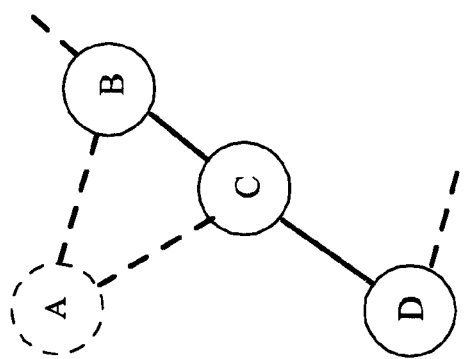
FIG. 3B is a schematic diagram of an example of a cluster of users connected by internal and external friendships.
Figure 3A:
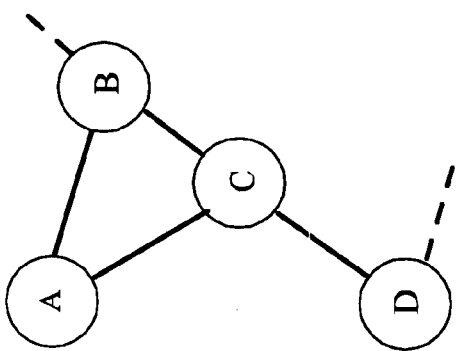
FIG. 3A is a schematic diagram of an example of a cluster of users connected by internal and external friendships.

FIG. 3A depicts a schematic diagram of an example of a cluster of users connected by internal and external friendships. FIG. 3A shows a cluster of four users, A, B, C, and D. The solid lines represent declared friendships within the cluster and the dashed lines are friendships outside of the cluster. The "weight" of the cluster is defined as the number of internal friendships divided by the total number of friendships. For the cluster in FIG. 1 the weight is $4/6$ (or $2/3$).

FIG. 3B depicts a schematic diagram of an example of a cluster of users connected by internal and external friendships. The influence score is a measure that captures the general "influence" of a particular user relative to the others members of a cluster. Higher scores mean more influence. The influence score of a particular user can be calculated by measuring how the weight of the cluster changes by removing that user. FIG. 3B shows the cluster from FIG. 3A with user A removed. The weight of original cluster is $2/3$, and the cluster in FIG. 3B has weight $2/6$ (or $1/3$), thus the influence score of user A is $2/3 - 1/3 = 1/3$.

FIG. 3C depicts a schematic diagram of an example of a cluster of users connected by internal and external friendships. FIG. 3C shows the cluster from FIG. 3A with user C removed. In this case, the cluster in FIG. 3C has a weight of $1/6$. This makes the influence score of user C equal to, $4/6 - 1/6 = 3/6$ (or $1/2$). Intuitively, the influence score of a particular user is related to how important they are in connecting the entire cluster. In FIG. 3A, it is clear that user C (influence score $1/2$) plays a larger role in linking the four users than user A (influence score $1/3$).

Subsequent to identifying the communities 106, the advertisement server 108 ranks the profile of each member 104 in the community 106. In one implementation, the web pages of each member 104 are ranked using the method described in the patent titled "Method for node ranking in a linked database," (U.S. Pat. No. 6,285,999 B1; inventor: Lawrence Page; date of patent: Sep. 4, 2001), the contents of which are incorporated by reference here.

Subsequent to ranking the profiles of the members 104 in each community 106, the advertisement server retrieves advertisements 214 to display on the profiles of one or all members 104 of the community 106. In one implementation, the advertisement server 108 identifies the one or more common interests of a community 106. In one aspect, the one or more interests may be identified based on the aggregate signals in the communities between members. In another aspect, the interest of a member may be determined based on the content of the member's profile, such as, web page. In another aspect, the interest of the community may be determined from the context or textual content of the profiles of all the members of the community.

The advertisement server 108 retrieves advertisements 214 relevant to the one or more common interests of the community 106. The advertisement server 108 transmits the advertisements 214 to the profiles of one or more members 104 of the community 106 for display. In one implementation, the advertisements 214 are transmitted using the method described in United States patent application publication titled, "Methods and apparatus for serving relevant advertisements," (publication no.: US 2004/0059708 A1, inventors: Jeffrey A. Dean, Georges R. Harik, Paul Bucheit, publication date: Mar. 25, 2004).

In one aspect, one or more advertisements are displayed on the profile of all members of a community. In another aspect, the number of advertisements displayed on a profile depends on the rank of the member within the community. One or more members in a community may also be members of other communities. In another aspect, the advertisements displayed on a member's profile may be blended to reflect the common interest of the one or more communities to which the member belongs.

Figure 4:
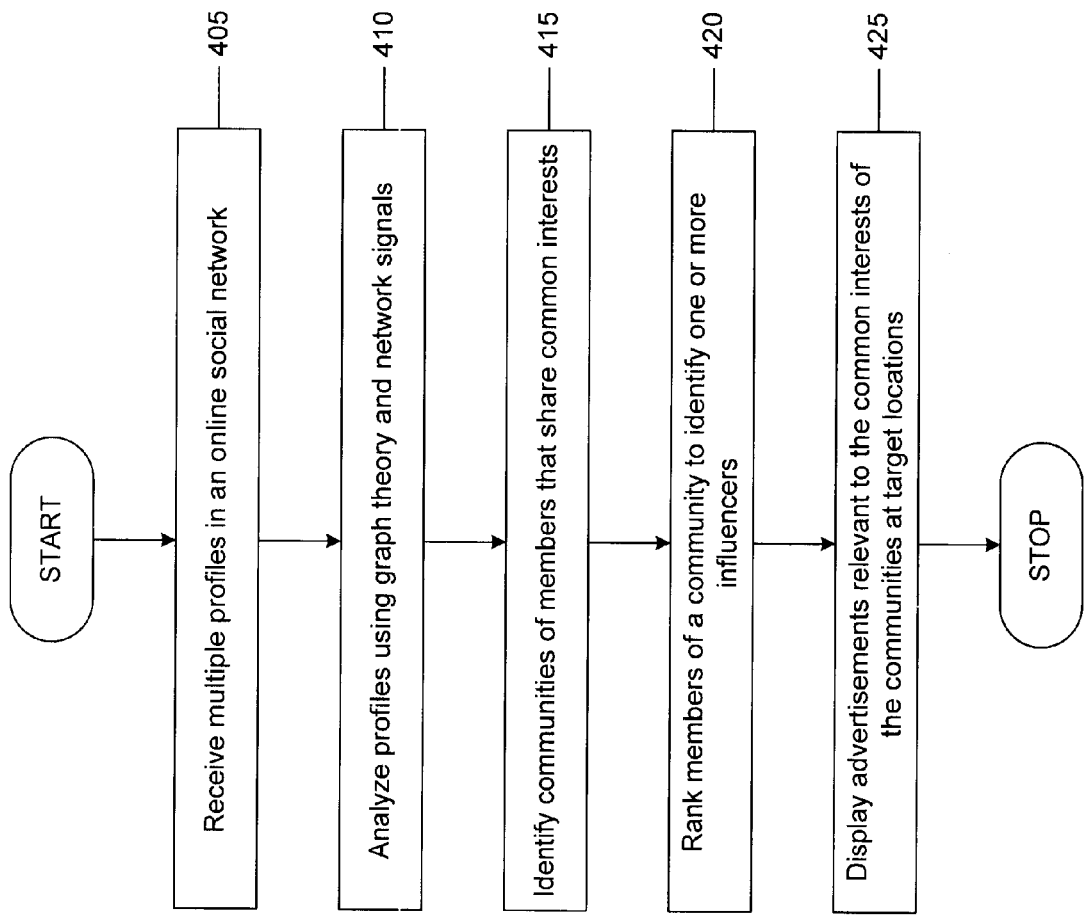
FIG. 4 is a flow chart of an example of a method for advertising to communities in an online social network.

FIG. 4 depicts a flow chart of an example of a method for advertising to communities in an online social network. The profiles of members of the online social network are received by the advertisement server at 405. In one implementation, a server hosts the online social network 102 and the profiles of the members. The profile for each member 104 comprises one or more web pages. The server hosting the network also stores the links between the members 104 of the network 102. The content of the profiles of the members and the links between the members 104 are included in the information transmitted by the server hosting the online social network and received by the advertisement server 108. Since the number of members in the network as well as the number and types of links between members is dynamic, the content of profiles and the links between members is regularly monitored and updated. In one aspect, the server hosting the network may monitor and update this information and transmit the same to the advertisement server. In another aspect, the advertisement server may monitor and update this information.

The interactions between members 104 are analyzed using graph theory and network signals at 410. A member 104 is linked to one or more members 104 through links of different types. The links from one member 104 have associated weights based on the number and the type of the links. One example of a link is a friendship link where members designates other members as friends. Another example of a link is fan link where members designates themselves as fans of other members. A link may be established when a member frequently visits another member's profile. In one aspect, the weights associated with links are a function of the number and the type of the links. In another aspect, weight is associated based only on the number of links from a member. In another aspect, links are designated equal weight regardless of the type of the link.

The members 104 of a community 106 establish links with one another due to shared common interests. Using graph theory and the links between members 104, communities 106 of members 104 are identified at 415 such that each member 104 belongs to at least one community 106. In addition, a member may belong to more than one community. Subsequent to identifying communities, the profiles of the members of each community are examined to determine the common interest of the community. In one aspect, the common interest is determined by examining the content of the profiles of each member of the community. In another aspect, the content of the profiles as well the aggregate signals within the community are used to determine the common interest of the community.

The members 104 of a community 106 are ranked to identify one or more influencers of the community at 420. Ranking assigns importance to profiles of members in a linked database. In one implementation, the rank assigned to a first member is calculated from the ranks of members linking to the first member. In one aspect, the member with the highest rank is designated as the influencer of the community. In another aspect, more than one member may be designated as influencers based on their rank.

Upon identifying communities 106 and designating influencers, the one or more common interests of members 104 are determined and advertisements relevant to the interest of the community are displayed on the profiles of the members at 425. In one aspect, the advertisements relevant to the interest of the community are displayed on the profiles of all the members of the community. In another aspect, the advertisements relevant to the community may be displayed on the profiles of the one or more influencers.

Figure 5:
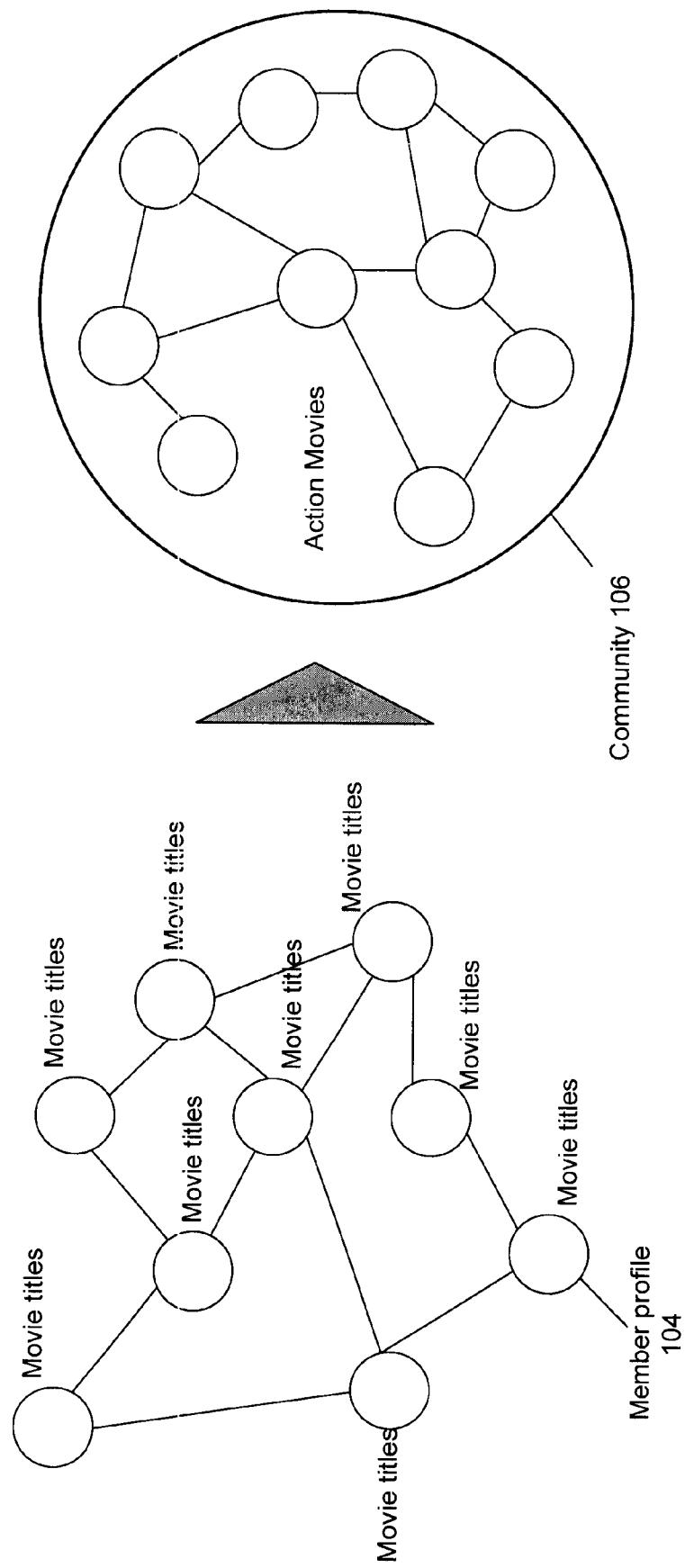
FIG. 5 is an example of profiles of members grouped into a community based on a common interest in movies.

FIG. 5 depicts an example of profiles of members grouped into a community based on a common interest in action movies. In this implementation, the profiles of all members contain content related to movies. In addition, the members establish links to one another by visiting the profiles of other members, designating friendships, and commenting on profiles. Based on the content of each profile and the aggregate signals between members, a community of movie fans is identified. Advertisements displayed on the profiles of one or all members of this community may be related to action movies.

Figure 6:
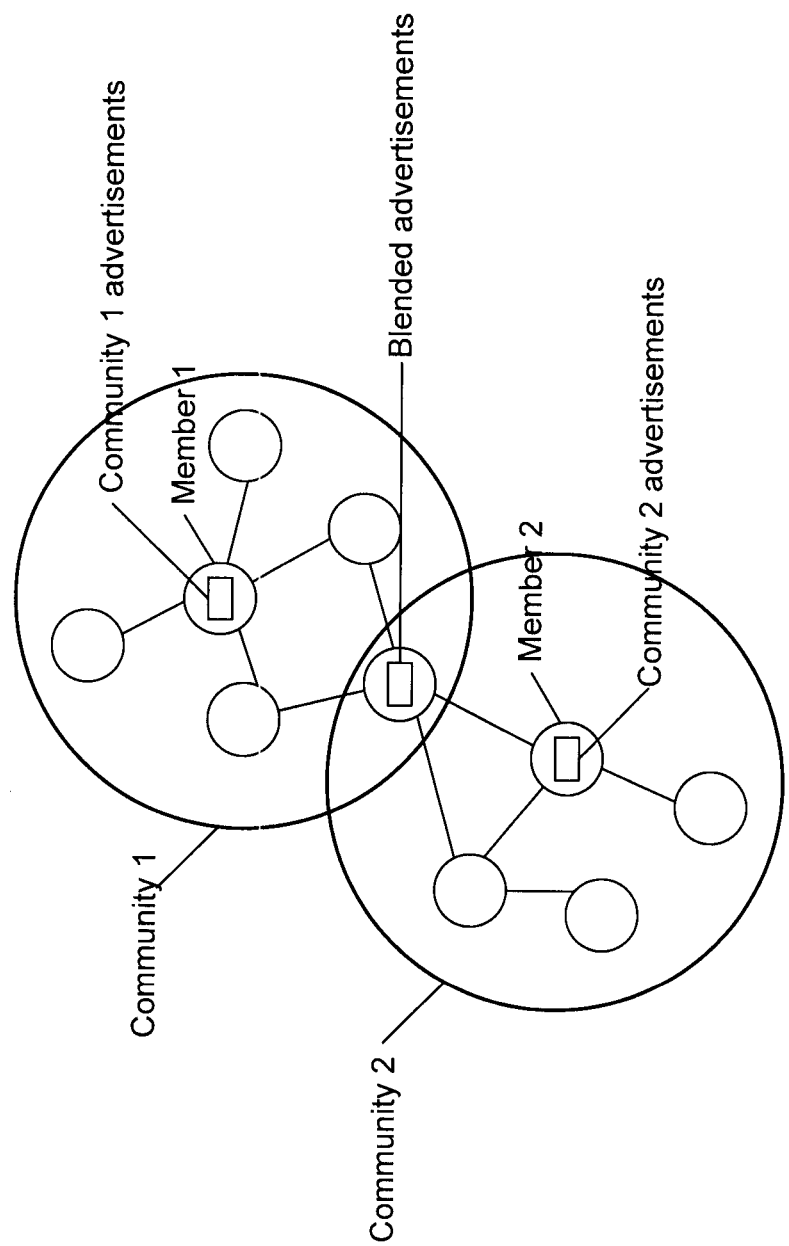
FIG. 6 is an example of blending advertisements for display on the profile of a member belonging to more than one community.

FIG. 6 depicts an example of blending advertisements for display on the profile of a member belonging to more than one community. In this implementation, based on content of profiles and member interactions, member 1 belongs to community 1 and member 2 belongs to community 2. Member 3 belongs to both communities 1 and 2 due to one or more overlapping interests between communities. The advertisements displayed on the profile of a member on community 1 and 2 are relevant to the interests of community 1 and 2, respectively. The blended advertisements displayed on the profile of member 3 are relevant to the interests of both communities.

Figure 7:
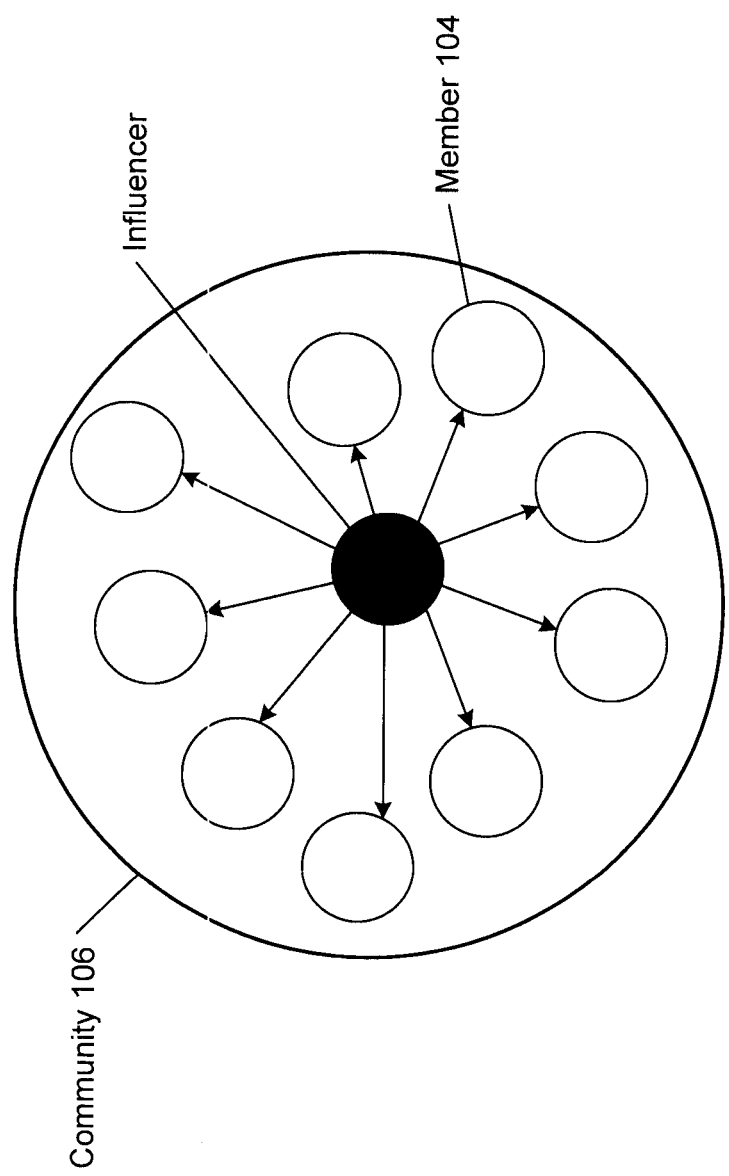
FIG. 7 is an example of designating one member as a network influencer of a community.

FIG. 7 depicts an example of designating one member as a network influencer of a community. Member 1 is linked to all members of the community 106 by the same or different types of links. Due to the number and the types of links, member 1 ranks highest among all other members in the community. Therefore, member 1 is designated as the influencer of the community 106. Advertisers may target the entire community by displaying advertisements on the profile of member 1 alone.

A number of implementations have been described. Nevertheless, it will be understood that various modifications are possible. For example, the aforementioned methods can be implemented as a computer-readable medium that stores instructions executable by one or more processing devices. The advertisement server 108 can include a micropayment system. In one implementation, the micropayment system can track a number of times a member selects a URL in an advertisement on a member's profile. Instead of charging the advertiser each time the URL is selected, the micropayment system can charge the advertiser after a charges associated with the clicks have crossed a predefined threshold, such as ten dollars. Alternatively, the micropayment system can accept a payment from an advertiser and create an account that the fees are debited against. Accordingly, other implementations are within the scope of the following claims.

In another implementation, a profile of a member may include web pages not associated with the online social network. These web pages may not include a standard structure of categories that describe a member. A member may design a web page that includes a variety of content including information about the member. For example, geocities.com hosts a variety of web sites that describe personal aspects of members of the web hosting service. In one aspect, membership to a community may be independent of web pages not associated with the online social network. In another aspect, the contents of the external web page may be used to determine interest of the member. In another aspect, links by members within the network to the external web pages may be ignored during identification of communities.

In another implementation, the contact information for a member may be determined from the member's profile. Subsequently, upon approval by the member, an advertiser may send advertisements to the member's contact information in lieu of or in addition to displaying advertisements on a web page that the member frequently visits.

In another implementation, an advertiser may be a member of the online social network. An advertiser may display advertisements on their profiles. Members interested in the products and services being advertised may establish links with the advertiser's profile. In this manner, an advertiser may attract consumers while also seeking out consumers.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for displaying advertisements to members of a network, the method comprising:
   identifying, by a computer, a community within a network, wherein the community comprises a plurality of members of the network, wherein at least two members of the plurality of members are linked to each other directly and wherein at least two members of the plurality of members are linked to each other indirectly, wherein the at least two indirectly linked members are each linked to a common member of the plurality of members;

determining a weight of the community based on a quantity of direct links among the members of the community and a quantity of indirect links among the members of the community;

for each member of the community, determining a respective score of influence by determining a change between the weight of the community when the member is included in the community and a weight of the community when the member is excluded from the community;

ranking, by the computer, each of the plurality of members included in the community, wherein a rank of a member is based on the member's score of influence;

identifying, by the computer, a plurality of influencers in the community, wherein the plurality of influencers are members of the community with highest ranks; and associating, by the computer, advertisements with the profiles of the plurality of influencers, wherein a quantity of advertisements associated with an influencer's profile depends upon a rank of the influencer in the community.

2. The method of claim 1, further comprising receiving information pertaining to a plurality of members belonging to the network, wherein the information comprises content of profiles of the plurality of members and information describing one or more members with whom each of the plurality of members is linked.

3. The method of claim 2, wherein identifying the community comprises grouping members who are directly and indirectly linked to each other.

4. The method of claim 3, wherein two members are connected to each other through a link that has a weight, the method further comprising associating one or more advertisements with a profile of each of the two members, wherein a quantity of advertisements associated with the profile is based on the weight of the link.

5. The method of claim 2, further comprising identifying one or more common interests of the plurality of members of the community based on the content of the profiles of the plurality of members.

6. The method of claim 2, wherein the network comprises an online social network.

7. The method of claim 6, wherein the profile comprises one or more web pages stored on a server hosting the online social network.

8. The method of claim 1, wherein a member of the network belongs to more than one community.

9. The method of claim 1, wherein the one or more advertisements are placed solely on the profiles of the one or more influencers.

10. The method of claim 1, wherein at least one member of the at least two indirectly linked members is directly linked to another member of the plurality of members.

11. The method of claim 1, wherein at least one member of the at least two directly linked members is indirectly linked to another member of the plurality of members.

12. The method of claim 1, wherein the common member is directly linked to another member of the plurality of members.

13. The method of claim 1, wherein associating advertisements with the profiles of each of the plurality of influencers comprises placing the advertisements on the profiles of each of the plurality of influencers.

14. The method of claim 1, further comprising:

determining that an influencer of the community is an influencer of another community within the network; and associating advertisements relevant to the other community together with the advertisements with the profile of the influencer of the community and of the other community.

15. The method of claim 1, further comprising iteratively optimizing the community to account for addition and removal of members from the plurality of members.

16. The method of claim 1, wherein a member's score of influence is based on a quantity of members with whom the member is directly linked and a quantity of members with whom the member is indirectly linked.

17. A non-transitory computer-readable medium storing instructions executable by one or more processing devices to perform operations for displaying advertisements to members of a network, the operations comprising:

identifying a community within a network, wherein the community comprises a plurality of members of the network, wherein at least two members of the plurality of members are linked to each other directly and wherein at least two members of the plurality of members are linked to each other indirectly, wherein the two members who are linked to each other indirectly are each directly linked to a same member of the plurality of members;

determining a weight of the community based on a quantity of direct links among the members of the community and a quantity of indirect links among the members of the community;

for each member of the community, determining a respective score of influence by determining a change between the weight of the community when the member is included in the community and a weight of the community when the member is excluded from the community;

ranking, by the computer, each of the plurality of members included in the community, wherein a rank of a member is based on the member's score of influence;

identifying a plurality of influencers in the community, wherein the plurality of influencers are members of the community with highest ranks; and associating advertisements with the profiles of the plurality of influencers, wherein a quantity of advertisements associated with an influencer's profile depends upon a rank of the influencer in the community.

18. The medium of claim 17, the operations further comprising receiving information pertaining to the plurality of members belonging to the network, wherein the information comprises content of profiles of the plurality of members and information describing one or more members with whom each of the plurality of members is linked.

19. The medium of claim 18, wherein the operations for identifying the community further comprises grouping members who are directly and indirectly linked to each other.

20. The medium of claim 19, wherein two members are directly connected to each other through a link that has a weight, the method further comprising associating one or more advertisements with a profile of each of the two members, wherein a quantity of advertisements associated with the profile is based on the weight of the link.

21. The medium of claim 18, the operations further comprising identifying one or more common interests of the plurality of members of the community based on the content of the profiles of the plurality of members.

22. The medium of claim 18, wherein the network comprises an online social network.

23. The medium of claim 22, wherein the profile comprises one or more web pages stored on a server hosting the online social network.

24. The medium of claim 17, wherein a member of the network belongs to more than one community.

25. The medium of claim 17, wherein the one or more advertisements are placed solely on the profiles of the one or more influencers.

26. The medium of claim 17, wherein at least one member of the at least two indirectly linked members is directly linked to another member of the plurality of members.

27. The medium of claim 17, wherein at least one member of the at least two directly linked members is indirectly linked to another member of the plurality of members.

28. The medium of claim 17, wherein the common member is directly linked to another member of the plurality of members.

29. The medium of claim 17, wherein associating advertisements with the profiles of each of the plurality of influencers comprises placing the advertisements on the profiles of each of the plurality of influencers.

30. The medium of claim 17, the operations further comprising:
   determining that an influencer of the community is an influencer of another community within the network; and
   associating advertisements relevant to the other community together with the advertisements with the profile of the influencer of the community and of the other community.

31. The medium of claim 17, the operations further comprising iteratively optimizing the community to account for addition and removal of members from the plurality of members.

32. The medium of claim 17, wherein a member's score of influence is based on a quantity of members with whom the member is directly linked and a quantity of members with whom the member is indirectly linked.

33. A method for displaying advertisements to members of a network, the method comprising:
   identifying, by a computer, a community within a network, wherein the community comprises a plurality of members of the network, wherein at least two members of the plurality of members are linked to each other directly and wherein at least two members of the plurality of members are linked to each other indirectly, wherein the at least two indirectly linked members are each linked to a common member of the plurality of members;
   determining a weight of the community by:
      identifying a first quantity of links between the plurality of members in the community;
      identifying a second quantity of links between members outside the community; and
      determining the weight of the community as a ratio of the first quantity to the second quantity,
   for each member of the community, determining a respective score of influence by determining a change between the weight of the community when the member is included in the community and a weight of the community when the member is excluded from the community;
   ranking, by the computer, each of the plurality of members included in the community, wherein a rank of a member is based on the member's score of influence;
   identifying, by the computer, a plurality of influencers in the community, wherein the plurality of influencers are members of the community with highest ranks; and
   associating, by the computer, advertisements with the profiles of the plurality of influencers, wherein a quantity of advertisements associated with an influencer's profile depends upon a rank of the influencer in the community.

* * * * *